UNITED STATES PATENT OFFICE.

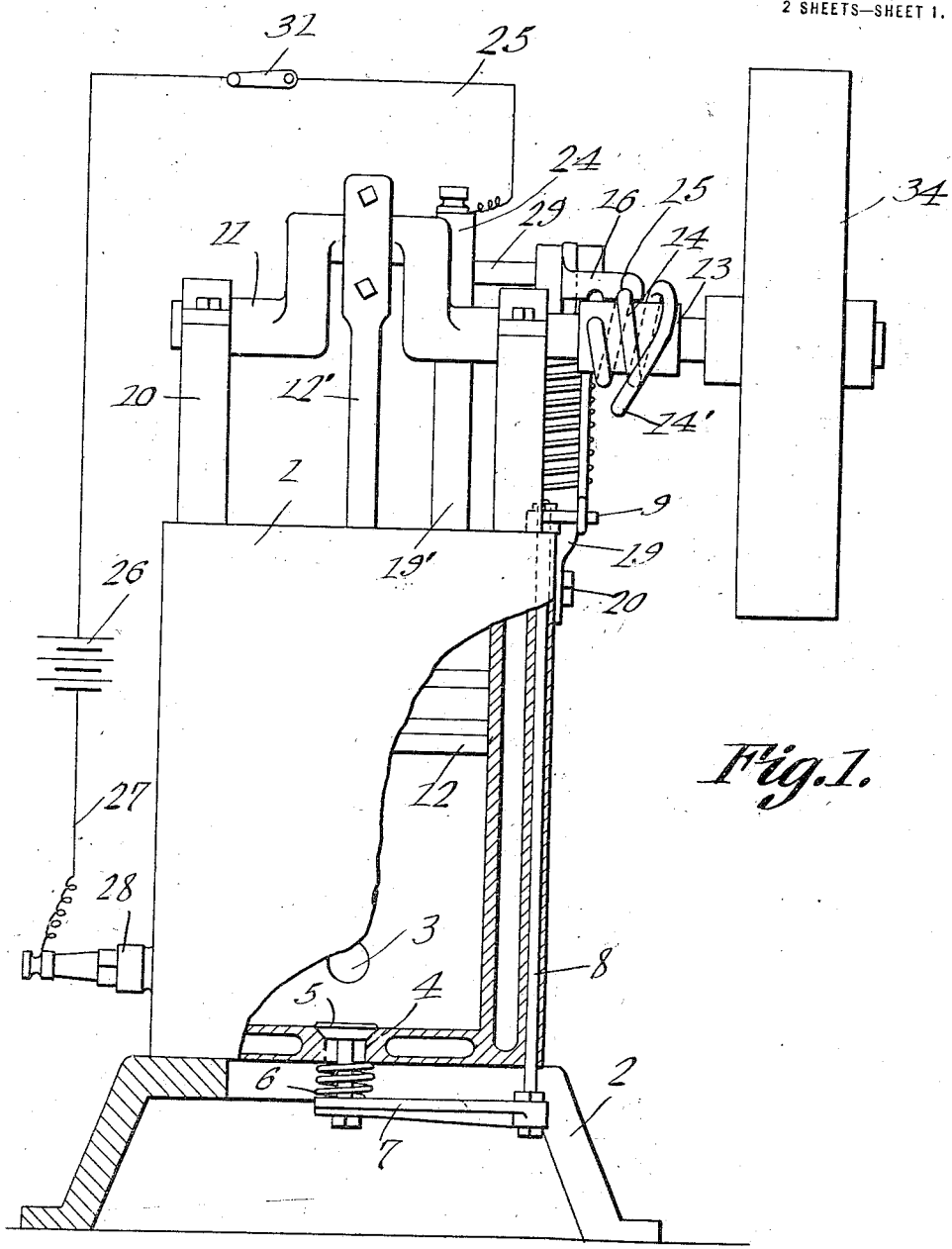

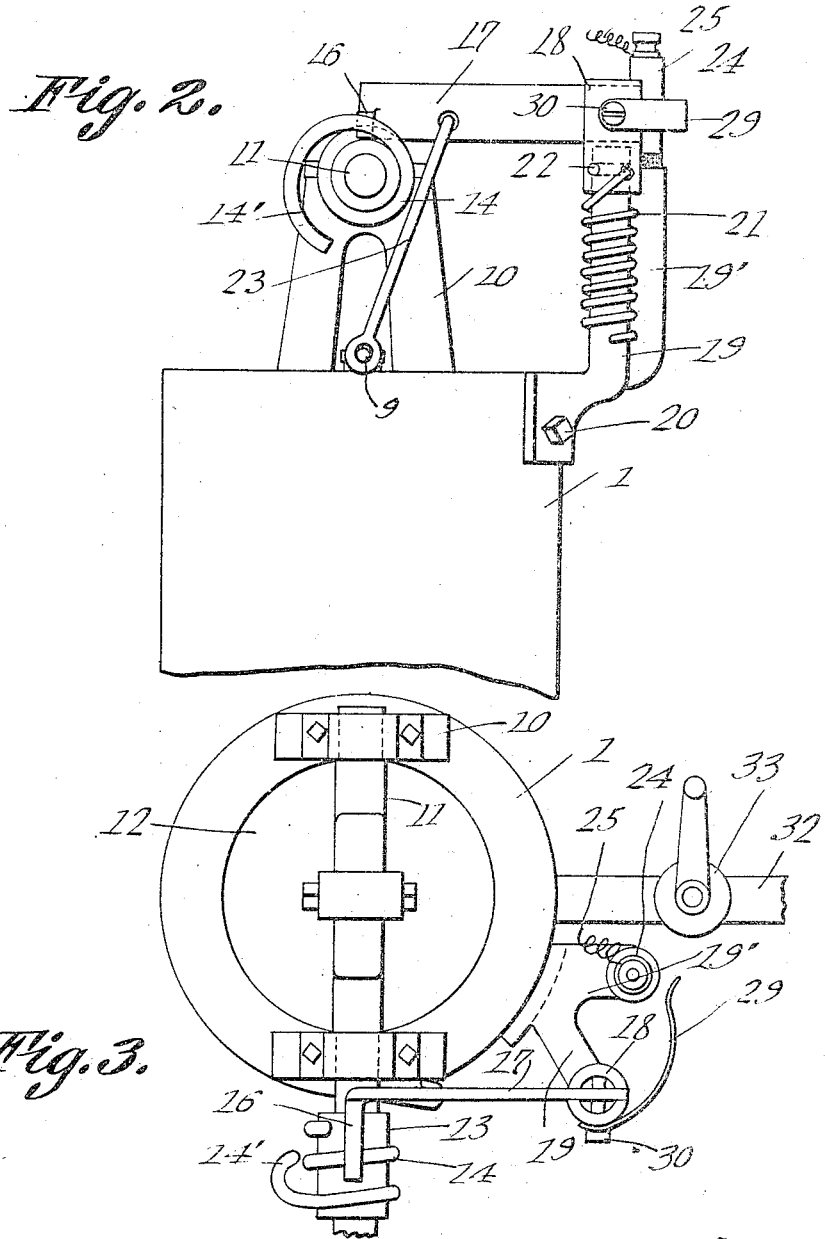

EMILE FOSS CHRISTIANI, OF WASHINGTON, DISTRICT OF COLUMBIA.

VALVE-GEAR.

1,298,008.

Specification of Letters Patent.  Patented Mar. 25, 1919.

Application filed August 5, 1918. Serial No. 248,420.

*To all whom it may concern:*

Be it known that I, EMILE F. CHRISTIANI, a citizen of Denmark, residing at Washington, in the District of Columbia, have invented a new and useful Valve-Gear, of which the following is a specification.

The subject of this invention is a valve gear intended, primarily, for operating the exhaust valve of an internal combustion engine.

The main object of the invention is the provision of means on the crank shaft for operating the valve, thereby obviating the necessity of a separate cam shaft or the like.

Another object of the invention is the provision of means for producing the spark for the engine.

The invention also contemplates generally improving the construction and enhancing the utility of valve gearing.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Figure 1 is a view in elevation of an engine constructed in accordance with the invention, portions being in section;

Fig. 2 is a fragmentary view in elevation, taken at right angles to Fig. 1 and from the right thereof, parts being removed;

Fig. 3 is a plan view.

Referring to the drawings by numerals of reference:—

The engine to which the gearing forming the subject matter of this invention is shown applied consists of a cylinder 1, which is vertically disposed, and the head of which is secured to and rests upon a bead plate or support 2. The cylinder is provided with the usual intake port 3, and with an exhaust port 4, formed in the head of the cylinder. The exhaust port 4 is closed by a valve 5 of the usual puppet type, the stem of which is encircled by a coiled spring 6 which is confined between the head of the cylinder and a finger 7, to the end of which finger the stem of the valve 5 is secured.

The finger 7 is secured to and extends radially from the lower end of a rod 8, which rod is mounted for rectilinear movement in a bore formed in the outer wall of the cylinder 1. It is, of course, understood that the rod 8 may be otherwise mounted on the cylinder if desired. At the upper end of the rod 8 is provided a connecting element, herein shown as a collar having a radially extening finger 9.

Standards 10 rise from the cylinder 1 and form supports for the journals of the crank shaft 11 of the engine. A connecting rod 12' links the crank of the shaft 11 to the piston 12 which is mounted for reciprocation in the cylinder 1.

Upon an extending end of the crank shaft 11 is rigidly secured a sleeve 13 upon which is formed a spiral cam thread 14, having a return portion 14', which serves to reset the mechanism and to open the exhaust, as will be set forth. The thread 14 is adapted to work in a notch 15 formed in the lower edge of a finger 16, which finger overlies the sleeve 13 and extends laterally from one end of an arm 17. That end of the arm 17 remote from the end from which the finger 16 extends is pivotally connected to a cuff 18, which is mounted to rock upon the upper end of a standard 19 which standard is secured by screws 20, or otherwise, to the cylinder 1, from which it rises. A torsion spring 21 encircles the standard 19 and has one end bent and anchored in an aperture formed in the cuff 18, while its other end is similarly bent and anchored in a recess formed in the standard 19. This spring serves to return the cuff to normal position after the same has been rocked to one side by the cam 14. A suitable stop 22 is provided in the cuff which enters a groove formed in the standard 19 and serves to limit the movement of the cuff 18.

A branch standard 19' rises from the base of the standard 19 and upon the upper end of this standard is secured a binding post 24, which post is insulated from the standard as shown. The binding post 24 is connected by a line wire 25 with one pole or terminal of a battery 26, and a switch 31 may be interposed in the line 25 for the purpose of opening the circuit when desired. The other pole of the battery 26 is connected by a wire 27 with one terminal of a spark plug 28, the other terminal of which is grounded to the engine.

A curved, resilient switch arm 29 is secured by a screw 30 or otherwise to the cuff 18, from which it extends in proper position to contact the binding post 24 when the piston has reached the desired position on compression stroke. The position of the arm 29 may be easily changed by changing the curvature of the arm so as to advance or retard the spark, if desired.

A link 23 connects the arm 17 to the pin 9 so that, as the arm is rocked vertically because of its travel along the cam 14, and end 14', the rod 8 is reciprocated to open and close the exhaust valve 5.

An intake pipe 32 may be provided for conducting fuel to the engine, and a fuel control 33 may be suitably connected in said pipe. The engine will also be provided with the usual balance, or fly wheel 34.

In practice the invention is operated in the following manner:—

When the engine is running, the cam thread is in engagement with the notch 15, and draws the arm 17 to the right as viewed in Fig. 1, in which figure compression stroke is just starting. When the piston has reached the end of the compression stroke, the arm 17 will be swung sufficiently to rock the cuff 18 to bring the switch arm 29 into contact with the binding post 24 and so cause a spark to ignite the charge in the cylinder. On the next half revolution of the crank shaft, when the power stroke is completed and the exhaust stroke is starting, the finger 16 rides on the portion 14' of the cam 14 and, because this portion is projected radially from the sleeve 13, pulls on the link 23 and rod 8 and lifts the exhaust valve 5. Also, because of the curvature of the portion 14', the finger 16 and arm 17 are returned to their normal positions ready to start another cycle of operations. In this return they are aided by the torsion spring 21.

Having thus described the invention, what is claimed as new and sought by Letters Patent, is:—

1. The combination with a cylinder having an inlet and an exhaust port, a piston, a crank shaft, and a connection between the crank shaft and the piston, of a valve normally closing the exhaust port, a slidably mounted valve lifting rod, a spiral cam thread having a return portion extending across the threads of the cam, an arm, means on the arm for engaging the thread of the cam, means operated by the lateral swinging of the arm under the action of the cam for controlling the ignition of a charge in the cylinder, and means operated by the elevation of the arm by the return portion of the cam thread for opening the exhaust valve.

2. The combination with a cylinder having an inlet and an exhaust port, a piston, a crank shaft, and a connection between the crank shaft and the piston, of a cam thread upon the crank shaft and having a return portion at one end extending across the thread, an arm mounted to swing in two intersecting planes, an exhaust valve, a connection between the valve and the arm, and means on the arm and engaging the thread for actuating the arm during the rotation of the crank shaft to control the ignition of a charge in the cylinder and to lift the valve.

3. A valve gear comprising, in combination with a cylinder having an inlet and an exhaust port, a piston reciprocable in the cylinder, a crank shaft, and a connecting rod between the crank shaft and the piston, of a spiral cam on the crank shaft, a standard, an arm extending from and rockable on the standard, said arm engaging the cam to be rocked thereby, means operated by the rocking of the arm for controlling the flow of fluid through one of the ports, a spark plug secured to and having one terminal grounded on the cylinder, a circuit wire connected to the other terminal of the plug, a source of electrical supply interposed in the circuit, a terminal for the circuit, and a switch arm carried by the standard and swung by the rockable arm to contact the terminal, the said switch arm in electrical contact with the cylinder.

In testimony that I claim the foregoing as my own, I have hereto affixed my signature in the presence of two witnesses.

EMILE FOSS CHRISTIANI.

Witnesses:
 IVY E. SIMPSON,
 HERBERT D. LAWSON.